United States Patent
Chen

(10) Patent No.: US 10,303,938 B2
(45) Date of Patent: May 28, 2019

(54) IDENTIFYING A STRUCTURE PRESENTED IN PORTABLE DOCUMENT FORMAT (PDF)

(71) Applicant: FactSet Research Systems Inc., New York, NY (US)

(72) Inventor: Yan Chen, Montville, NJ (US)

(73) Assignee: Factset Research Systems Inc, New York, NY (US)

( * ) Notice: Subject to any disclaimer, the term of this patent is extended or adjusted under 35 U.S.C. 154(b) by 103 days.

(21) Appl. No.: 15/393,362

(22) Filed: Dec. 29, 2016

(65) Prior Publication Data

US 2018/0189560 A1   Jul. 5, 2018

(51) Int. Cl.
  *G06K 9/32* (2006.01)
  *G06K 9/00* (2006.01)
  *G06K 9/46* (2006.01)
  *G06K 9/62* (2006.01)

(52) U.S. Cl.
  CPC ..... *G06K 9/00449* (2013.01); *G06K 9/00463* (2013.01); *G06K 9/00469* (2013.01); *G06K 9/3275* (2013.01); *G06K 9/46* (2013.01); *G06K 9/6296* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,140,468 B2* | 3/2012 | Kwok | ................... | G06Q 10/10 382/195 |
| 8,468,445 B2* | 6/2013 | Gupta | ............... | G06F 17/30908 715/234 |
| 2006/0277173 A1* | 12/2006 | Li | ........................ | G06F 17/211 |
| 2008/0025608 A1* | 1/2008 | Meunier | ............ | G06K 9/00449 382/181 |
| 2015/0026566 A1 | 1/2015 | Stadermann et al. | | |
| 2015/0093021 A1* | 4/2015 | Xu | ..................... | G06K 9/00463 382/159 |

OTHER PUBLICATIONS

ISR for PCT/US2017/067275, mailed Apr. 26, 2018.

* cited by examiner

*Primary Examiner* — Tsung Yin Tsai
(74) *Attorney, Agent, or Firm* — Hunton Andrews Kurth LLP

(57) ABSTRACT

There is provided a method to identify structure of a native PDF document. The method comprises: obtaining a native PDF document having a first line to start a table and a second line to end the table; detecting a value of a physical feature of the native PDF document, wherein the physical feature has a corresponding weighting factor; initiating a value to the weighting factor; assigning a first status for the first line and a second status for the second line based on (a) the physical feature and (b) the weighting factor; and identifying a location of the table on native PDF document from the first status and the second status, thus yielding an identified location of the table.

17 Claims, 15 Drawing Sheets

BOLD THINKING
Understanding the evolving dynamics of the healthcare sector has been key to the growth and development of our company for the last 30 years.

Healthcare is globally one of the largest sectors in all first world economies. The sector has been highlighted by advances in technology and treatment both in medical devices and pharmaceuticals.

The effect of these advances has been to create an almost insatiable demand for improved patient care and access. All governments have struggled to find ways to provide funding to meet this demand. On the supply side these conflicting tensions have led to commoditisation of most product categories, which in turn has led to on-going merger and acquisition activity. In such a dynamic and changing environment EBOS has sought to find ways to add value from the point of manufacturer to the point of clinical use.

Initially EBOS was operating in a small market not long free from the constraints of import licensing and the cost-plus margins that regime fostered. EBOS viewed the changing landscape and saw an opportunity to control its own destiny by shifting away from a product focus to follow patients through their life cycle and accessing channels to market that supported patient needs.

With that bold vision to step away from convention, our Company embarked on an acquisition strategy to reshape and refocus the business. We did so with speed, marking 19 acquisitions over the next 12 years making frugal use of capital whilst still delivering returns to shareholders. Looking back the journey seemed logical however few followed our path.

Our boldness, determination to pursue our goals and to make efficient use of resources have become a hallmark of the constant reinvention of our business. The key has been to match the timing of market shifts to our own business model.

BOLD THINKING
Understanding the evolving dynamics of the healthcare sector has been key to the growth and development of our company for the last 30 years.

Healthcare is globally one of the largest sectors in all first world economies. The sector has been highlighted by advances in technology and treatment both in medical devices and pharmaceuticals.

The effect of these advances has been to create an almost insatiable demand for improved patient care and access. All governments have struggled to find ways to provide funding to meet this demand. On the supply side these conflicting tensions have led to commoditisation of most product categories, which in turn has led to on-going merger and acquisition activity. In such a dynamic and changing environment EBOS has sought to find ways to add value from the point of manufacturer to the point of clinical use.

Initially EBOS was operating in a small market not long free from the constraints of import licensing and the cost-plus margins that regime fostered. EBOS viewed the changing landscape and saw an opportunity to control its own destiny by shifting away from a product focus to follow patients through their life cycle and accessing channels to market that supported patient needs.

With that bold vision to step away from convention, our Company embarked on an acquisition strategy to reshape and refocus the business. We did so with speed, marking 19 acquisitions over the next 12 years making frugal use of capital whilst still delivering returns to shareholders. Looking back the journey seemed logical however few followed our path.

Our boldness, determination to pursue our goals and to make efficient use of resources have become a hallmark of the constant reinvention of our business. The key has been to match the timing of market shifts to our own business model.

FIG. 4

Management's Discussion and Analysis
Energy

515 —
> Energy revenues from the fourth quarter were $254 milllion, an increase of $12 million compared to the same period in 2011, mainly due to increased throughput because of higher availability of natural gas at certain NGL 510 —
> Energy revenues for the year were $928 million, a decrease of $159 million compared to 2011, mainly due to reduced throughput because of lower availability of natural gas supply at certain NGL extraction facilities.

Adjust Earnings for ATCO Power and ATCO Energy Solutions are shown in the following table:

505

| ($ Millions) | For the Three Months Ended December 31 | | | For the Year Ended December 31 | | |
|---|---|---|---|---|---|---|
| | 2012 | 2011 | Change (2012-2011) | 2012 | 2011 | Change (2012-2011) |
| ATCO Power | | | | | | |
| Independent Power Plants | 9 | 15 | (6) | 78 | 85 | (7) |
| Regulated power Plants | 18 | 12 | 6 | 46 | 56 | (10) |
| Total ATCO Power | 27 | 27 | - | 124 | 141 | (17) |
| ATCO Energy Solutions | | | | | | |
| Storage Operations | 11 | 2 | 9 | 18 | 5 | 13 |
| NGL Extraction Operations | - | 6 | (6) | 11 | 25 | (14) |
| Gas Gathering & Processing and Others Operations | (8) | (4) | (4) | (22) | (11) | (11) |
| Total ATCO Energy Solutions | 3 | 4 | (1) | 7 | 19 | (12) |
| Other | 1 | 1 | - | 5 | 4 | 1 |
| Total | 31 | 32 | (1) | 136 | 164 | (28) |

Adjust Earning for the fourth quarter decreased by $1 million compared to the same period in 2011. Adjust earnings in ATCO power plants were lower due to planned maintenance outage at the Joffre generating plan in the fourth quarter of 2012 and an impairment charge of $7 million recording for the UK.

Adjust Earning for the year were $136 million compared to 2011. Mainly due to major planned maintenance outages at the Battle River and Sheerness.

FIG. 5

Pool Prices in ATCO Power's Independent Power Plants in Alberta and Reduced Revenue from the Barking Generating Plant Due to Adverse Market Conditions in the UK.

Adjusted Earnings for ATCO Power and ATCO Energy Solutions are Shown in the Following Table:

| ($ Millions) | For the Three Months Ended December 31 | | | For the Year Ended December 31 | | |
|---|---|---|---|---|---|---|
| | 2012 | 2011 | Change (2012-2011) | 2012 | 2011 | Change (2012-2011) |
| ATCO Power | | | | | | |
| Independent Power Plants | 9 | 15 | (6) | 78 | 85 | (7) |
| Regulated Power Plants | 18 | 12 | 6 | 46 | 56 | (10) |
| Total ATCO Power | 27 | 27 | - | 124 | 141 | (17) |
| ATCO Energy Solutions | | | | | | |
| Storage Operations | 11 | 2 | 9 | 18 | 5 | 13 |
| NGL Extraction Operations | - | 6 | (6) | 11 | 25 | (14) |
| Gas Gathering & Processing and Others Operations | (8) | (4) | (4) | (22) | (11) | (11) |
| Total ATCO Energy Solutions | 3 | 4 | (1) | 7 | 19 | (12) |
| Other | 1 | 1 | - | 5 | 4 | 1 |
| Total | 31 | 32 | (1) | 136 | 164 | (28) |

Adjusted Earnings for the fourth quarter decreased by $1 million compared to the same period in 2011. Adjusted earnings in ATCO power's Independent power plants were lower due to planned maintenance outage at the Joffre generating plan in the fourth quarter of 2012 and an impairment charge of $7 million

| | Notes | Consolidated 2014 $Millions | 2013 $Millions | 2014 $Millions | 2013 $Millions par... |
|---|---|---|---|---|---|
| Cash flows from operating activities | | | | | |
| Cash was provider from customers | | 2,395.7 | 2,327.9 | 0.5 | 0.3 |
| Receipts from associates | | 107.4 | 38.1 | - | - |
| Distributions received | | 0.8 | 0.3 | 26.0 | 136.9 |
| Other dividends received | | 5.7 | 4.8 | 0.2 | 0.1 |
| Interest received | | 2,509.6 | 2,371.1 | 26.7 | 137.3 |
| Cash was disbursed to: | | | | | |
| Payments to suppliers and employees | | (1,886.5) | (1,844.2) | (31.5) | (25.1) |
| Interest (paid) | | (173.2) | (186.1) | (70.9) | (68.5) |
| Taxation (paid) / refunded | | (42.7) | (52.8) | 1.6 | (5.2) |
| | | (2,102.4) | (2,083.1) | (100.8) | (98.8) |
| Net Cash Inflow / (outflow) from operating activities | 18 | 407 | 288.0 | (74.1) | 38.5 |
| Cash flows from Investing activities | | | | | |
| Cash was Provided from: | | | | | |
| Proceeds from repayment of associate financing | | 179.8 | - | - | - |
| Proceeds from sale of property, plant and equipment | | 26.1 | 1.0 | - | - |
| Cash arising on obtaining control of subsidiaries | | 160.2 | 9.7 | 137.0 | - |
| Return of security deposits | | 9.3 | - | - | - |
| Cash advanced from subsidiary | | | | | |

```
<pages>

<layout>
      <box name="MediaBox" X="0" Y="0" width="595.22" height="842"/>
      <box name="CropBox" X="0" Y="0" width="595.22" height="842"/>
      <box name="PageBox" X="0" Y="0" width="595.22" height="842"/>
    </layout>
    <content>
      <lines>
        <rect x0="332.154" y0="14.783" x1="538.083" y1="170.823" color="#231F20" stroked="1" linewidth="0.5"/>
        <rect x0="479.055" y0="18.636" x1="524.409" y1="144.11" color="#EDDABD" filled="1"/>
        <stroke x0="345.118" y0="127.919" x1="524.409" y1="127.919" color="#00AEEF" linewidth="1"/>
        <stroke x0="345.118" y0="44.458" x1="524.409" y1="44.458" color="#00AEEF" linewidth="0.5"/>
        <stroke x0="345.118" y0="19.136" x1="524.409" y1="19.136" color="#00AEEF" linewidth="1"/>
      </lines>
      <span font="whitney-semibold" size="10" color="#231F20" x0="70.8661" y0="137.577" x1="116.816" y1="150.487">
        <word x0="70.8661" y0="137.577" x1="116.816" y1="150.487" text="DIVIDEND">68,73,86,73,68,69,78,68</word>
      </span>
      <span font="FuturaBT-Medium" size="7" color="#231F20" X0="350.079" Y0="131.419" X1="369.973" Y1="139.812">
        <word x0="350.079" y0="131.419" x1="369.973" y1="139.812" text="$000s">36,48,48,48,115</word>
      </span>
      <span font="FuturaBT-Medium" size="7" color="#231F20" x0="503.248" y0="131.419" x1="520.16" y1="139.812">
        <word x0="503.248" y0="131.419" x1="520.16" y1="139.812" text="2013">50,48,49,51</word>
      </span>
      <span font="FuturaBT-Medium" size="8" color="#231F20" x0="498.405" y0="115.914" x1="520.149" y1="125.506">
        <word x0="498.405" y0="115.914" x1="520.149" y1="125.506" text="3,514">51,44,53,49,52</word>
      </span>
```

FIG. 9

| Market | Canada | Australia | New Zealand |
|---|---|---|---|
| Number of Tested Documents | 89.00 | 92.00 | 54.00 |
| Recovered Table Ratio (%) | 95.30% | 97.10% | 95.20% |

IDENTIFYING A STRUCTURE PRESENTED IN PORTABLE DOCUMENT FORMAT (PDF)

BACKGROUND OF THE DISCLOSURE

1. Field of the Disclosure

The present disclosure relates to a system and a method to identify a structure, for example, a table, which is represented in a native PDF document. More particularly, the present disclosure relates to identifying the structure by use of sequence tagging.

2. Description of the Related Art

Structures of a document can be lost when the document is converted from portable document format (PDF) to HTML. For example, a table structure will be lost during this conversion and the converted HTML may only display plain text. To properly utilize an element in a table of a document, a person needs to recover structures of the document to understand whether the element is a part of the table, and if the element is a part of the table, the person needs to know the location of the element in the table.

Structures of a document are not entirely lost when the document is converted into a PDF document. When a person views a PDF document, the person can identify page layout, paragraphs and tables of the PDF document. Accordingly, logical structures of the PDF document are still present and can be possibly recovered. In order to extract relevant information from the PDF document for data extraction and translation, the person needs to recover structures of the document, or at least recover the elements such as tables and paragraphs that are relevant to the document.

Structure recovery of a document can be beneficial. For example, structures of a document are crucial for high quality translation, because a translation system needs linguistically complete unit, or sentences to have sufficient context for the translation to be completed. Further, software applications that perform information extraction and summarization of a document can also benefit greatly from a document that has structures.

However, extracting structural information, e.g., tables, from PDF documents can be challenging largely because relations between elements such as words and numbers are not defined explicitly in a machine-readable format.

While some heuristic applications for structure recovery of PDF tables can produce high quality output for a certain type of input, these recovery applications can be extremely cumbersome and fragile for diverse inputs. Additionally, these applications cannot be applied to identify structures of non-English PDF documents. These applications use heuristic rules to identify structures for English documents. Because non-English documents may have big difference on table structures, these heuristic rules may be useless to recover structure for them.

To solve the above problems, there is a need for a system and a method to identify a structure presented in a native PDF document.

SUMMARY OF THE DISCLOSURE

There is provided a method to identify a structure presented in a native PDF document. The method comprises obtaining a native PDF document having a first line to start a table and a second line to end the table; detecting a value of a physical feature of the native PDF document, wherein the physical feature has a corresponding weighting factor; initiating a value to the weighting factor; assigning a first status for the first line and a second status for the second line based on (a) the physical feature and (b) the weighting factor; and identifying a location of the table in the native PDF from the first status and the second status, thus yielding an identified location of the table.

According to the method, the native PDF document is a reference native PDF document having a known location of the table, and the method further comprises: comparing the identified location to the known location, thus yielding a difference between the identified location and the known location; and updating the value of the weighting factor to reduce the difference, thus yielding an updated value for the weighting factor.

The method further comprises repeating the assigning and the identifying using the updated value, thus yielding an updated identified location of the table.

The method further comprises extracting rows, columns and cells of the table based on the updated identified location.

The method further comprises: detecting a value of the physical feature for a second native PDF document; and identifying a location of a second table in the second native PDF document based on (a) the value of the physical feature for the second election image and (b) the updated value for the weighting factor.

According to the method, the detecting comprises converting the native PDF document to a file having lines of text (alpha and/or numeric) of the native PDF document. Lines of the native PDF document include the first line, the second line, and other lines.

There is provided a system to identify a structure presented in a native PDF document. The system comprises: a processor; and a memory that contains instructions that are readable by the processor to cause the processor to perform actions of: obtaining from a storage device a native PDF document having a first line to start a table and a second line to end the table; detecting a value of a physical feature of the native PDF document, wherein the physical feature has a corresponding weighting factor; initiating a value to the weighting factor; assigning a first status for the first line and a second status for the second line based on (a) the physical feature and (b) a weighting factor; and identifying a location of the table in the native PDF document from the first status and the second status, thus yielding an identified location of the table.

According to the system, the native PDF document is a reference native PDF document having a known location of the table, and the instructions also cause the processor to perform actions of: comparing the identified location to the known location, thus yielding a difference between the identified location and the known location; and updating the value to reduce the difference, thus yielding an updated value for the weighting factor.

According to the system, the instructions also cause the processor to perform action of repeating the assigning and the identifying using the updated value, thus yielding an updated identified location of the table.

According to the system, the instructions also cause the processor to perform action of extracting rows, columns and cells of the table based on the updated identified location.

According to the system, the instructions also cause the processor to perform actions of: detecting a value of the physical feature for a second native PDF document; and identifying a location of a second table in the second native PDF document based on (a) the value of the physical feature for the second election image and (b) the updated value for the weighting factor.

According to the system, the detecting comprising converting the native PDF document to a file having lines of text (alpha and/or numeric) of the native PDF document. Lines of the native PDF document include the first line, the second line, and other lines.

There is provided a non-transitory computer readable medium comprising instructions that are readable by a processor. The instructions cause the processor to perform actions of: obtaining a native PDF document having a first line to start a table and a second line to end the table; detecting a value of a physical feature of the native PDF document, wherein the physical feature has a corresponding weighting factor; initiating a value to the weighting factor; assigning a first status for the first line and a second status for the second line based on (a) the physical feature and (b) a weighting factor; and identifying a location of the table in the native PDF document from the first status and the second status, thus yielding an identified location of the table.

According to the non-transitory computer readable medium, the native PDF is a reference native PDF document having a known location of the table, and the instructions cause the processor to perform actions of: comparing the identified location to the known location, thus yielding a difference between the identified location and the known location; and updating the value to reduce the difference, thus yielding an updated value for the weighting factor.

According to the non-transitory computer readable medium, the instructions also cause the processor to perform action of repeating the assigning and the identifying using the updated value, thus yielding an updated identified location of the table.

According to the non-transitory computer readable medium, wherein the instructions also cause the processor to perform action of extracting rows, columns and cells of the table based on the updated identified location.

According to the non-transitory computer readable medium, the instructions also cause the processor to perform actions of: detecting a value of the physical feature for a second native PDF document; and identifying a location of a second table in the second native PDF document based on (a) the value of the physical feature for the second election image and (b) the updated value for the weighting factor.

According to the non-transitory computer readable medium, the detecting comprises converting the native PDF document to a file having lines of text (alpha and/or numeric) of the native PDF document. Lines of the native PDF document include the first line, the second line and other lines.

BRIEF DESCRIPTION OF THE DRAWINGS

FIG. 3 is a representation of an upper portion of a native PDF document.

FIG. 4 is a representation of a lower portion of the native PDF document of FIG. 3, indicated by rectangles.

FIG. 5 is a representation of paragraphs and table areas of the native PDF document of FIG. 3, indicated by rectangles.

FIG. 6 is a representation of identifying structures of the native PDF document of FIG. 5.

FIG. 9 is a representation of a native PDF document that has been converted to an extensible markup language (XML) file.

A component or a feature that is common to more than one drawing is indicated with the same reference number in each of the drawings.

DESCRIPTION OF THE DISCLOSURE

Sequence tagging assigns a label, e.g., a word class, to each word/token in a document. A token represents a single word, punctuation or significant whitespace symbol. Each word/token can be tagged as, for example, DET, NN, VBS and VBG. Here DET is used for a determiner, NN is for noun, VBS is for verb and VBG is for gerund or present participle verb.

Part-of-speech (POS) tagging is one example of sequence tagging. A goal of POS tagging is to build a model for an input sentence having a sequence of words or tokens and further to label the sentence with tags such as adjective, noun, preposition, verb and adverb.

For example, for an input sentence:
The dog likes running.
"The" is a determiner, "dog" is a noun, "likes" is a verb, and "running" is a gerund.
Thus, the output is a tag sequence,
DET NN VBS VBG.
The tag sequence has the same length as the input sentence, i.e., a single tag corresponds to a word in the sentence.

Further, conditional random field (CRF) can be utilized for sequence tagging applications. CRF is a graphical model for representation and inference in multivariate probability distributions. Specifically, multivariate probability distribution is used to study the relationship among characteristics and the prediction of one based on the other(s). Specifically, CRF is a class of statistical modeling method that can be utilized in pattern recognition and machine learning to predict structures of a document. CRF encodes known relationships between tags, and constructs consistent interpretations of structures of the document in accordance with the known relationships. A linear chain CRF predicts sequences of labels for input sentences.

Given an observed feature vector X, CRF can predict an output vector $Y=\{y_1, y_2, \ldots, y_t\}$ of random variables. For example, in a POS tagging application, each random variable $y_s$ is a POS tag of a word at position s, and input X is divided into feature vectors $\{x_1, x_2, \ldots, x_t\}$. Each $x_t$ contains information of the word at position s such as its identity and orthographic features such as prefixes, suffixes and membership in domain-specific lexicons, like nouns, verbs and adjectives.

In the present disclosure, sequence tagging and CRF are utilized to identify structures of a native PDF document.

Figure 1:
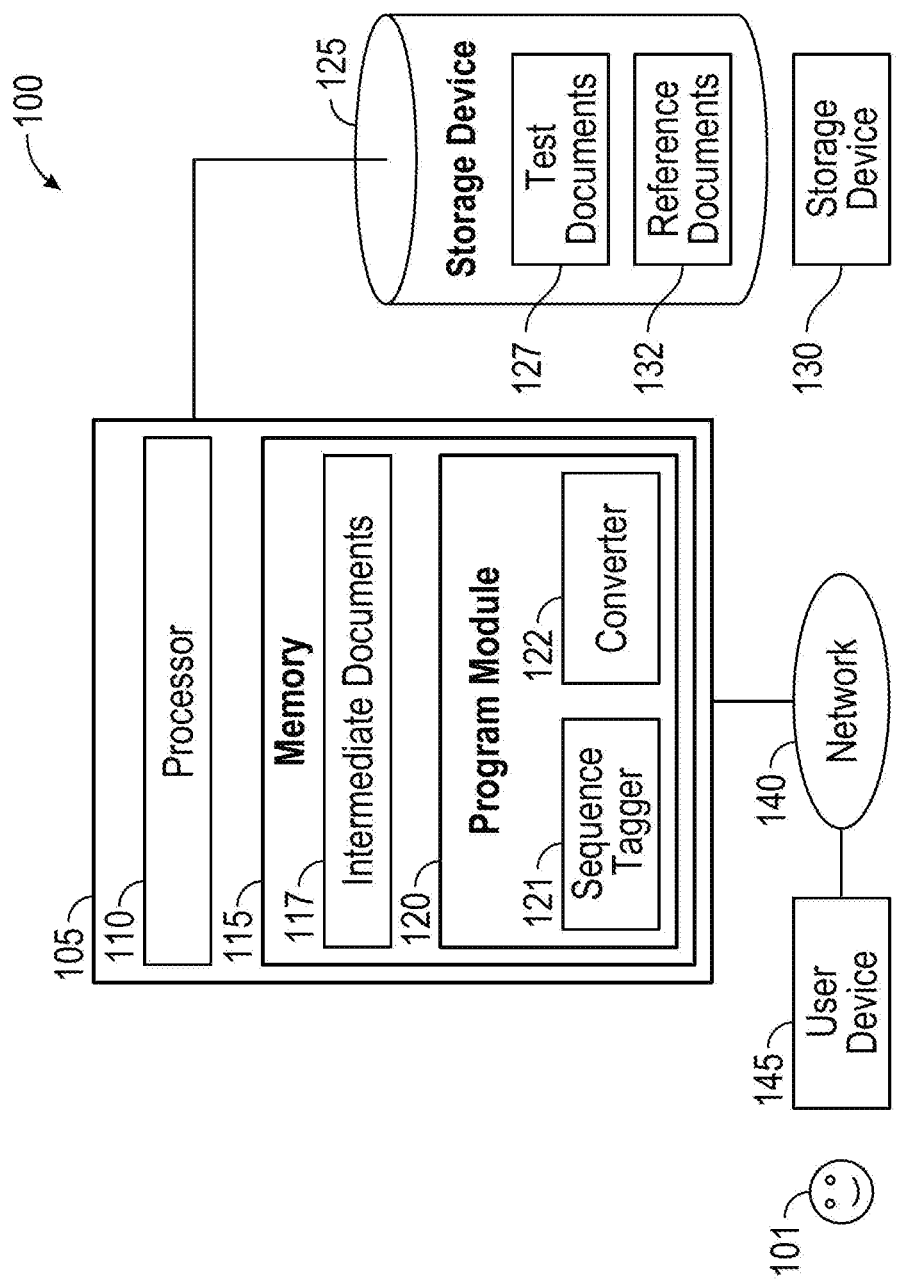
FIG. 1 is a block diagram of a system for identifying a structure presented in a native PDF document.

FIG. 1 is a block diagram of a system 100 for identifying a structure presented in a native PDF document.

System 100 includes a computer 105 coupled to a network 140, a storage device 125 for storage of test documents 127 and reference documents 132, a storage device 130, and a user device 145.

Network 140 is a data communications network. Network 140 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, (f) the Internet, or (g) a telephone network. Communications are conducted via network 140 by way of electronic signals and optical signals.

Computer 105 includes a processor 110 and a memory 115 coupled to processor 110. Although computer 105 is represented herein as a standalone device, it is not limited to such, but instead can be coupled to other devices (not shown) in a distributed processing system.

Processor 110 is an electronic device configured of logic circuitry that responds to and executes instructions.

Memory 115 is a tangible computer-readable storage medium encoded with a computer program. In this regard, memory 115 stores files and instructions, i.e., program code, that are readable and executable by processor 110 for controlling the operation of processor 110. Memory 115 can be implemented in a random access memory (RAM), a hard disc drive, solid state drive, a read only memory (ROM), or a combination thereof. Further, memory 115 stores intermediate documents 117 that are converted from test documents 117 and reference documents 132 by a converter 122. A user 101 can also operate the conversion of test documents 117 and reference documents 132 to intermediate documents 117 manually. Intermediate documents 117 can be XML files. One of the components of memory 115 is a program module 120.

Program module 120 contains instructions for controlling processor 110 to execute the method described herein. For example, under control of program module 120, processor 110 identifies a structure presented in a native PDF document.

The term "module" is used herein to denote a functional operation that may be embodied either as a stand-alone component or as an integrated configuration of a plurality of subordinate components. Thus, program module 120 may be implemented as a single module or as a plurality of modules that operate in cooperation with one another. Moreover, although program module 120 is described herein as being installed in memory 115, and therefore being implemented in software, it could be implemented in any of hardware (e.g., electronic circuitry), firmware, software, or a combination thereof.

Program module 120 comprises converter 122 and a sequence tagger 121.

Converter 122 converts a document from an original file format to a different file format. For example, the original file format can be a PDF file format, and the different file format is an extensible markup language (XML) file format.

Figure 8:
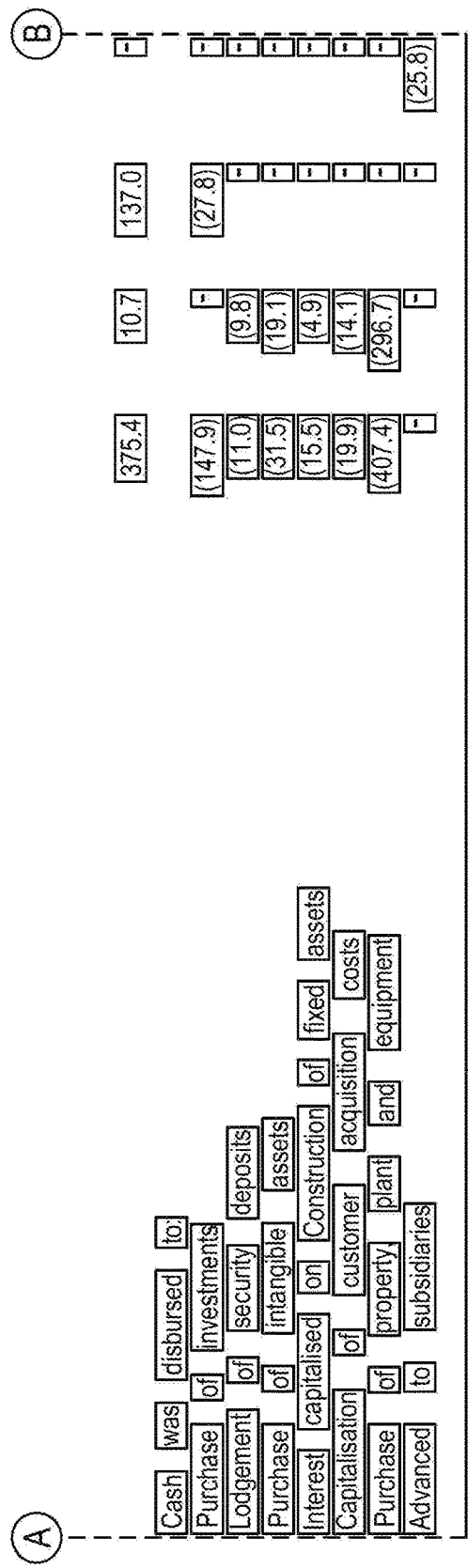
FIG. 8 is a representation of converting a native PDF document with a PDF annotator.

A document conversion by user 101 is described in FIG. 8 and a document conversion by converter 122 is described in FIG. 9.

After the document is converted from a PDF file format to an XML file format by converter 122, sequence tagger 121 tags each line of the XML file and identifies the structure of the each line. Sequence tagger 121 is trained to tag reference documents 132 first. Reference documents 132 are documents that have known structures, and locations of the known structures are also known. Reference documents 132 are utilized to train sequence tagger 121. After sequence tagger 121 is trained, sequence tagger 121 is utilized to identify structures of test documents 127. Test documents 127 are documents that have structures, but locations of the structures on the documents are not yet identified. Both test documents 127 and reference documents 132 can be PDF documents. Sequence tagger 121 is described in FIG. 2.

Storage device 125 may be implemented in any form of storage device. Storage device 125 may be implemented as a separate component, e.g., a separate hard drive, or in a common physical component, e.g., a single database.

While program module 120 is indicated as already loaded into memory 115, it may be configured on storage device 130 for subsequent loading into memory 115. Storage device 130 is a tangible computer-readable storage medium that stores program module 120 thereon. Examples of storage device 130 include a compact disk, a magnetic tape, a read only memory, an optical storage media, a hard drive or a memory unit consisting of multiple parallel hard drives, and a universal serial bus (USB) flash drive. Alternatively, storage device 130 can be a random access memory, or other type of electronic storage device coupled to computer 105 via network 140.

User device 145 includes an input device, such as a keyboard, speech recognition subsystem or gesture recognition subsystem, for enabling user 101 to communicate information via network 140, to and from computer 105. User device 145 also includes an output device such as a display or a speech synthesizer. A cursor control or a touch-sensitive screen allows user 101 to utilize user device 145 for communicating additional information and command selections to processor 110 and computer 105.

Processor 110 outputs, to user device 145, a result of an execution of the method described herein.

In the present disclosure, although operations are described as being performed by computer 105, or by system 100 or its subordinate systems, the operations are actually performed by processor 110.

Figure 2:
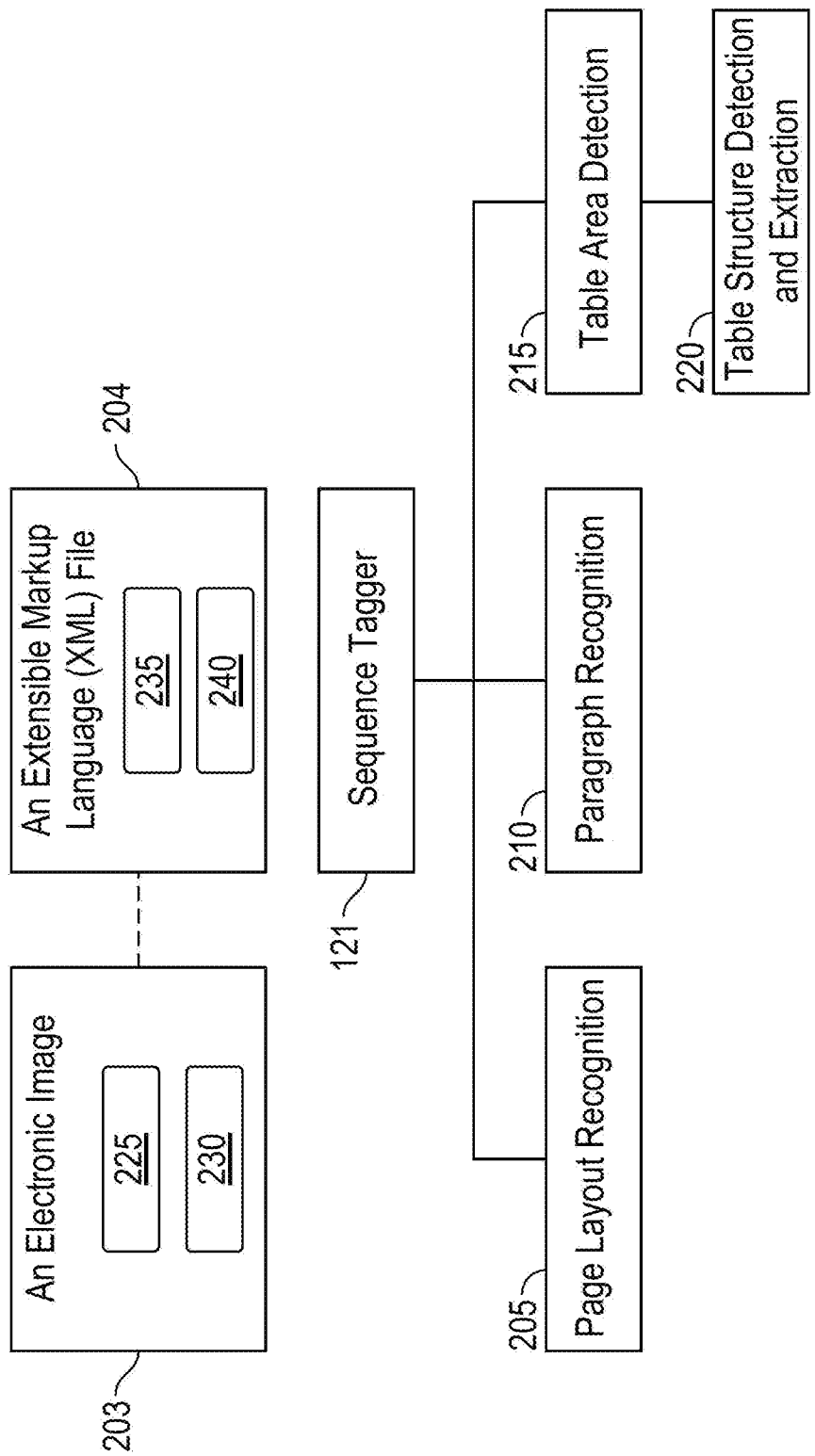
FIG. 2 is a block diagram of a sequence tagger of the system of FIG. 1.

FIG. 2 is a block diagram of sequence tagger 121. A native PDF document 203 of an exemplary document is utilized to describe the operation of sequence tagger 121. Native PDF document 203 has an upper portion 225 and a lower portion 230. Structures of native PDF document 203 include page layouts, paragraphs and tables.

Sequence tagger 121 does not tag each line of native PDF document 203 directly. Native PDF document 203 is first converted to an XML file 204 from which computer 105 can read text, image and bold line and read locations of text, image and stroke of file 204. File 204 includes lines of text (alpha and/or numeric) of native PDF document 203. File 204 has an upper portion 235 and a lower portion 240.

Sequence tagger 121 has three major functions: page layout recognition 205, paragraph recognition 210 and table area detection 215. Table area detection 215 has a function of table structure detection and extraction 220.

Sequence tagging is utilized for structure recovery of native PDF document 203.

Sequence tagger 121 tags and identifies each line of XML file 204. More specifically, for page layout recognition 205, sequence tagger 121 identifies heading and title start, heading and title in, or heading and title out of XML file 204. Sequence tagger 121 also tags and identifies each line as column start, column in, or column out of XML file 204. Further, for page layout recognition 205, sequence tagger 121 tags and identifies all page blocks on XML file 204. A page block is an area with independent and complete semantics, which is similar to a layerout of newspaper contains many blocks and each block is an independent unit. For example, many financial markets use a single page block format for financial reporting, but financial markets in Australian and New Zealand use newspaper layout format for financial reporting. To identify tables and paragraphs accurately on XML file 204, all page blocks are first identified.

For paragraph recognition 210, sequence tagger 121 tags each paragraph of XML file 204 with sequence tagging. Specifically, sequence tagger 121 identifies paragraph start and paragraph end. Once sequence tagger 121 identifies the statuses of paragraph start and paragraph end for each paragraph, each paragraph of file 204 is identified.

For table area detection 215, sequence tagger 121 tags each line of XML file 204, and identifies table start, inside table, and outside table for a table in XML file 204. Once sequence tagger 121 identifies the status of each line, a table area can be identified.

For table structure detection and extraction 220, sequence tagger 121 extracts rows, columns and cells of the table that is identified by sequence tagger 121.

FIG. 3 is a representation of upper portion 225 of native PDF document 203.

FIG. 4 is a representation of upper portion 225 of native PDF document 203, indicated by rectangles. Native PDF document 203 has four blocks: namely a title and heading 405, and columns 410, 415 and 420. Title and heading 405 and columns 410, 415 and 420 represent a page layout of upper portion 225 of native PDF document 203.

FIG. 5 is a representation of lower portion 230 of native PDF document 203, indicated by rectangles. For example, native PDF document 203 contains a table 505, paragraphs 510 and 515. Lines of native PDF document 203 include a first line of table 505, a second line of table 505 and all other lines of table 505.

FIG. 6 is a representation of identifying structures of table 505 in native PDF document 203. In FIG. 6, sequence tagger 121 tags the first line of table 505 as "B" 610, and lines inside table 505 as "I" 615, and the other lines outside table 505 as "O" 605. After sequence tagger 121 identifies all areas that contain tables in XML file 204, areas that do not contain tables in XML file 204 are assumed to represent paragraphs.

A machine learning method CRF is utilized for sequence tagging. Specifically, linear chain CRF 700 is utilized to identify structures of native PDF document 203.

Figure 7:
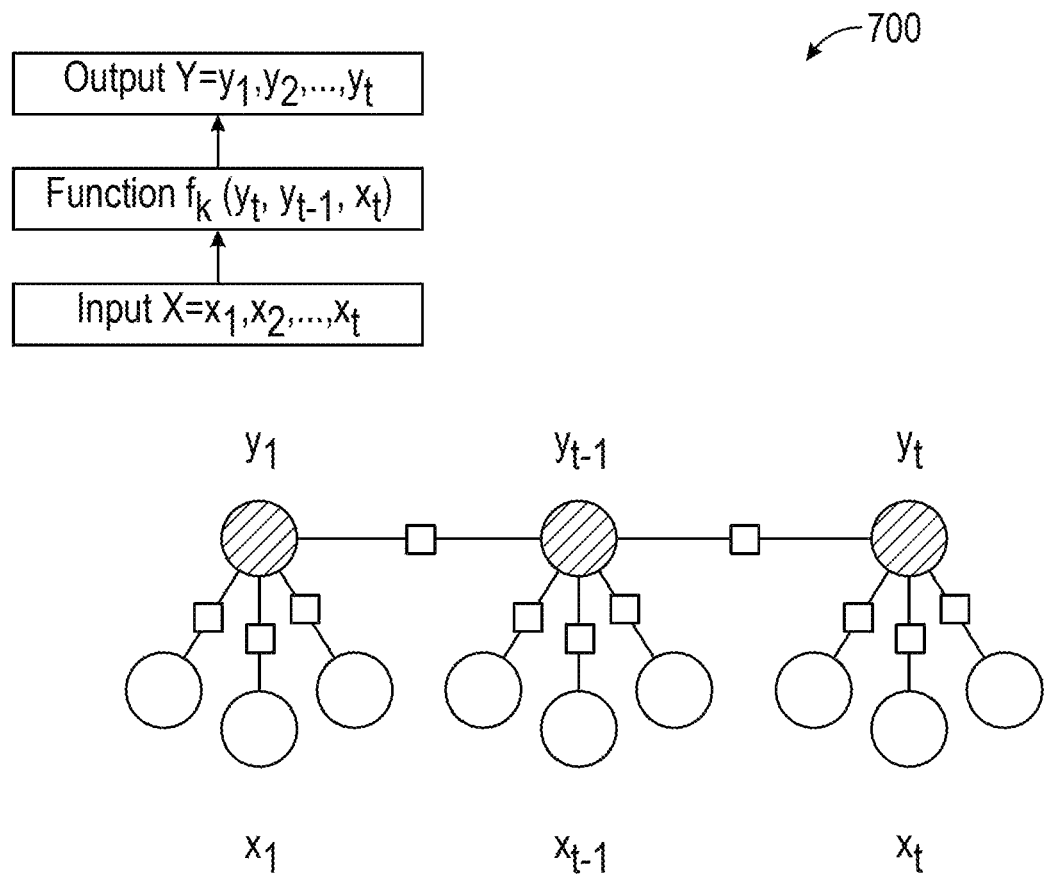
FIG. 7 is a representation of a graphical model of a linear chain conditional random field (CRF).

FIG. 7 is a representation of a graphical model of a linear chain CRF 700. In FIG. 7, a status of a tag of linear chain CRF 700 depends on a status of its previous tag of the tag, and further depends on a feature of a plurality of features X ($x_1$, $x_2$, ..., $x_t$). More specifically, tag $y_t$ is impacted by previous tag $y_{t-1}$, and also impacted by a feature $x_t$. To build linear chain CRF 700, a feature function $f_k(y_t, y_{t-1}, x_t)$ needs to be first determined, wherein t ranges from 1 to K, and K is the number of feature functions.

In linear chain CRF 700, $x(x_1, x_2, ..., x_t)$ and $y(y_1, y_2, ..., y_t)$ are random vectors, $\theta = \{\theta_k\} \in \Re^K$ is a parameter vector, and $\mathcal{F} = \{f_k(y_t, y_{t-1}, x_t)\}_{K=1}^K$ represents a plurality of feature functions. More specifically, $\theta_k$ is a weighting factor corresponding to $f_k$. $X_t$ is an input feature of the feature function $f_k$, and $y_t$ is an output of the feature function $f_k$. Then liner chain CRF 700 is a distribution P(y|x) that takes the form:

$$P(y|x) = \frac{1}{z(x)} \prod_{t=1}^{T} \exp\left\{\sum_{k=1}^{K} \theta_k f_k(y_t, y_{t-1}, x_t)\right\} \quad \text{Equation (1)}$$

where z(x) is an input-dependent normalization function:

$$Z(x) = \Sigma_y \Pi_{t=1}^T \exp\{\Sigma_{k=1}^K \theta_k f_k(y_t, y_{t-1}, x_t)\} \quad \text{Equation (2)}$$

P(y|x) is a probability between 0 and 1, wherein t is a position of a feature in a sentence, t is the number of positions in the sentence, K is the number of the feature functions, x is an input feature for the plurality of feature functions, and y is an output of the feature functions.

MALLET is a Java-based package for statistical natural language processing. It contains algorithms for classification, clustering and sequence tagging. It implements Hidden Markov Models (HMM), Maximum Entropy Markov Models (MEMM) and CRF for sequence tagging.

In the present disclosure, MALLET CRF is utilized to identify page layouts, paragraphs and tables. Mallet is an exemplary method of sequence tagging. However, the present disclosure does not necessarily tie to utilize Mallet as sequence tagging application. Many other popular implements, such as CRF++, GRMM, CRFSuite and FACTORIE, can be utilized as sequence tagging application for the present disclosure.

Further, a sequence tagging application can be any implement that has been developed or will be developed for sequence tagging in the future.

FIG. 8 is a representation of converting a native PDF 801 with a PDF annotator. In FIG. 8, user 101 selects a table area 805 of native PDF 801 that is loaded in a PDF annotator 800. After user 101 selects table area 805, user 101 can save table area 805 as a HTML file or an XML file. File conversion operated by user 101 is normally for reference documents 132.

FIG. 9 is a representation of a native PDF 901 that has been converted to an XML file 900 by converter 122. The conversion by converter by 122 is normally for test documents 127. An exemplary converter can be a poppler converter, which is an open source software application that reads text, image and strokes, and further reads locations of text, image and strokes of a native PDF document. In FIG. 9, converter 122 generates XML file 900 from native PDF 901. XML file 900 has text, image and strokes, and has locations of text, image and strokes of native PDF 901.

After the conversion, internal data objects of native PDF 901 are generated in XML file 900 from native PDF 901. The internal data objects represent page, text, text font information and text location information of native PDF 901. The internal data objects can be utilized for sequence tagging by sequence tagger 121.

XML file 900 contains page information 905, including page number and rotation information. Rotation information includes information on whether contents of native PDF 901 have been rotated from 0 degrees to 359 degrees. In general, documents are written from left to right and there is no rotation in these documents. However, when documents are written from bottom to top vertically, rotation is necessary to have the documents to be in a format that is written from left to right. Page layout 910 describes page size information such as page width and height. Span 915 describes text information such as text content and locations of text content with a bounding box 920. Bounding box 920 contains a pair of x and y coordinates to indicate left bottom and right top of text (alpha and/or numeric) of native PDF 901.

After converter 122 converts native PDF 901 to XML file 900, XML file 900 has text contents and lines of text (alpha and/or numeric) of native PDF 901. A line represents a list of tokens with y coordinates overlapped, and a line can be a paragraph line or a table row. Sequence tagger 121 tags each line of XML file 900. A method 1200 of training sequence tagger 121 first trains sequence tagger 121, which is described in FIG. 12. After sequence tagger 121 is trained, sequence tagger 121 is applied and evaluated in identifying tables, which are described FIGS. 13-15. Specifically, a method 1300 of applying sequence tagger 121 is described in FIG. 13. A method 1400 of testing sequence tagger 121 is described in FIG. 14. Accuracy of identifying structures of a native PDF by sequence tagger 121 is presented in FIG. 15.

In method 1200 of training sequence tagger 121, user 101 selects a table area of a native PDF that is loaded in PDF annotator 800 and then saves the selected table area to a HTML file or an XML file. Accordingly, reference documents 132 from native PDF files are converted to XML files during the method 1200 of training sequence tagger 121. In method 1200 of training sequence tagger 121, converter 122 can also be utilized to automatically convert reference documents 132 to XML files.

Both in method 1300 of applying sequence tagger 121 and in method 1400 of testing sequence tagger 121, converter 122 automatically converts test documents 127 to XML files. No manual selection is necessary to convert test documents 127 to XML files during method 1400 of testing sequence tagger 121.

Figure 10:
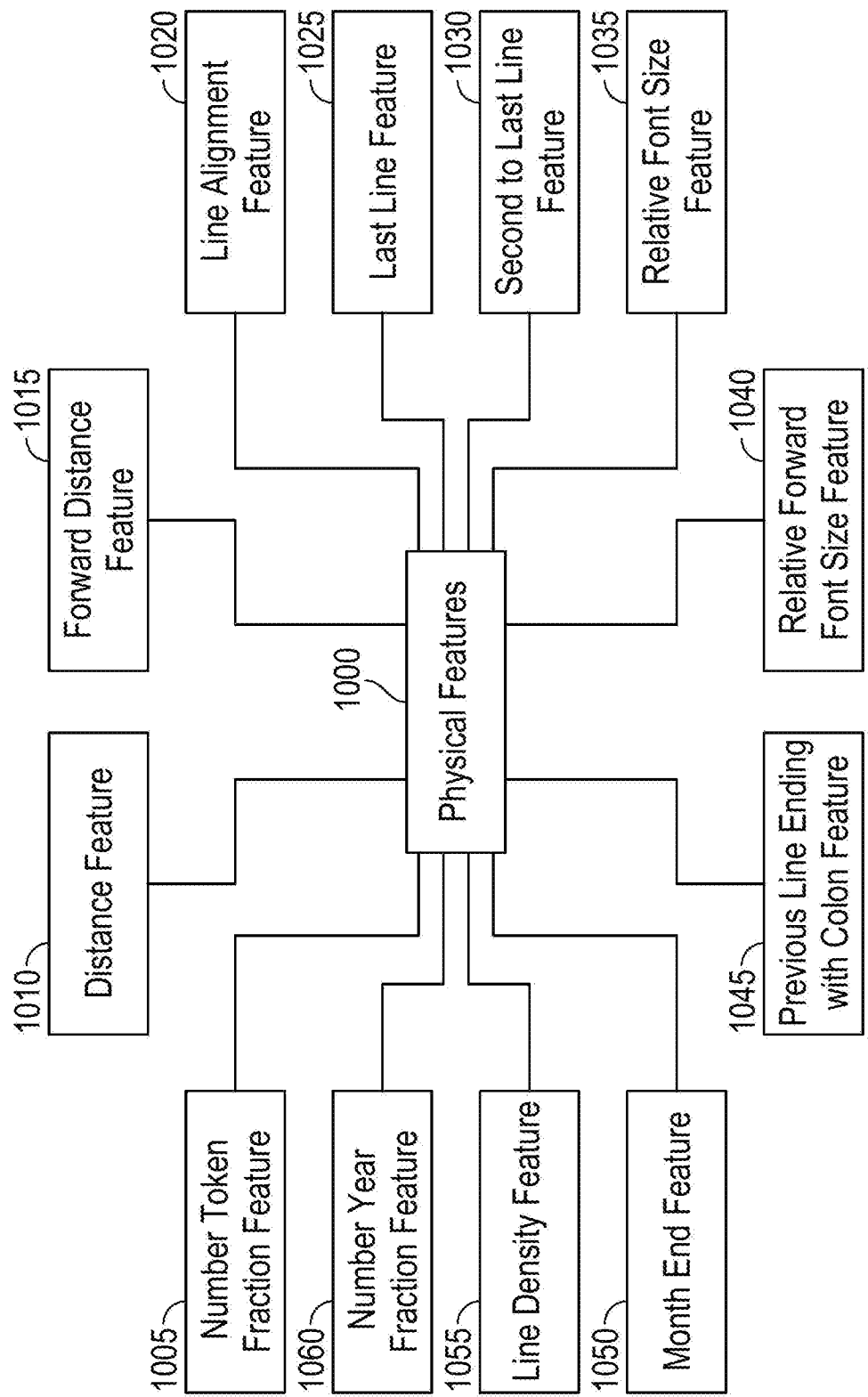
FIG. 10 is a diagram of some exemplary physical features utilized in sequence tagging.

FIG. 10 is a diagram of some exemplary physical features utilized in sequence tagging. Physical features 1000 are inputs for a feature function in methods 1200, 1300 and 1400. Specifically, physical features 1000 as inputs for a feature function are to train, test and/or evaluate sequence tagger 121.

Physical features 1000 include, but are not limited to, number token fraction feature 1005, distance feature 1010, forward distance feature 1015, line alignment feature 1020, last line feature 1025, second to last line feature 1030, relative font size feature 1035, relative forward font size feature 1040, previous line ending with colon feature 1045, month end feature 1050, line density feature 1055, and number year fraction feature 1060.

Number token fraction feature 1005 is defined as a ratio of the number of number tokens divided by a total number of tokens in a current line.

For example, a current Line has five tokens: 234, 34.5, 78.9, 123321, and "test"

Number Tokens are 234, 34.5, 78.9 and 123321, and therefore the number of number tokens is four.

Number token fraction feature 1005 is therefore equal to four divided by five, which is 0.8.

Distance feature 1010 is defined as a vertical distance between a current line and the line that is located right above the current line.

Forward distance feature 1015 is defined as a vertical distance between a current line and the next line after the current line.

Line alignment feature 1020 is a feature to determine whether a line is aligned on left, right or center on a native PDF document.

Last line feature 1025 is a feature to determine whether a current line is the last line on a native PDF document.

Second to last line feature 1030 is a feature to determine whether the next line of a current line is the last line on a native PDF document.

Relative font size feature 1035 is defined as a ratio between the token font size of a current line divided by the token font size of the previous line.

Relative forward font size feature 1040 is defined as a ratio between the token font size of a current line divided by the token font size of the next line after the current line.

Previous line ending with colon 1045 is a feature that a previous line ends with a colon.

Month end feature 1050 is a feature to determine whether a current line contains words such as "three months ended", "six months ended", "nine months ended" or "twelve months ended".

Line density feature 1055 is defined as the total length of tokens divided by the length of a line.

Number year fraction feature 1060 is defined as the total number of number tokens and year tokens divided by the total number of tokens in a current line.

For example, a sentence is: on May 20, 2014.

The number tokens is 20, and the year token is 2014. The total number of number tokens and year tokens is two. The total number of tokens in the sentence is four. Accordingly, number year fraction feature 1160 is equal to two divided by four, which is equal to 0.5.

Figure 11:
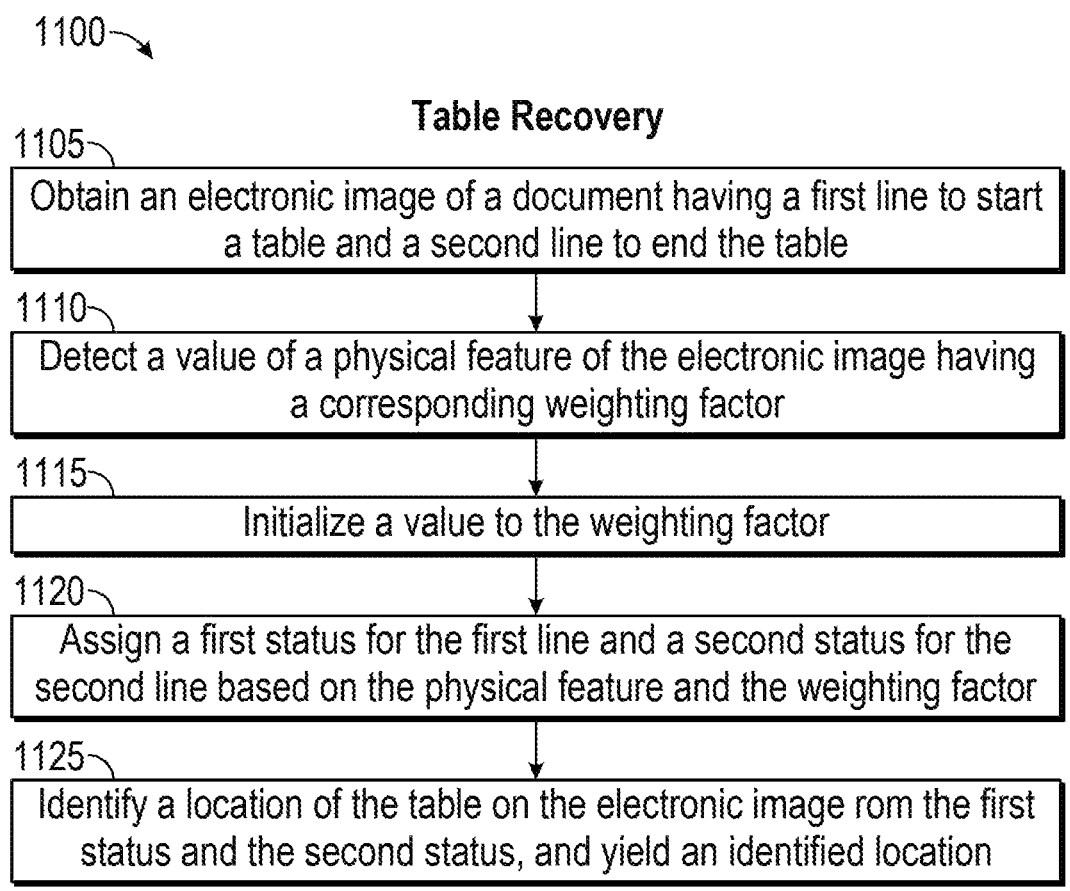
FIG. 11 is a flowchart of a method of table recovery employed by the system of FIG. 1.

FIG. 11 is a flowchart of a method of table recovery, i.e., method 1100, employed by system 100. Method 1100 comprises the following operations from an operation 1105 to an operation 1125.

During operation 1105, processor 110 obtains native PDF document 203. The native PDF has table 505. Table 505 includes a first line to start table 505 and a second line to end table 505. Converter 122 converts native PDF document 203 to XML file 204.

During operation 1110, processor 110 detects a value of a physical feature of XML file 204 and native PDF document 203. There is a weighting factor corresponding to the physical feature. The physical feature can be any physical features 1000.

During operation 1115, processor 110 initializes a value to the weighting factor.

During operation 1120, sequence tagger 121 tags a first line to start table 505 and a second line to end table 505. Program module 120 assigns a first status for the first line and a second status for the second line based on (a) the physical feature and (b) the weighting factor.

During operation 1125, processor 110 identifies a location of table 505 in native PDF document 203 from the first status and the second status. An identified location is yielded from the identification of the location of table 505.

In system 100, sequence tagger 121 applies a MALLET CRF application programming interface (API) for identifying page layout, paragraph and table areas, and then method 1200 trains sequence tagger 121 with reference documents 132.

Figure 12:
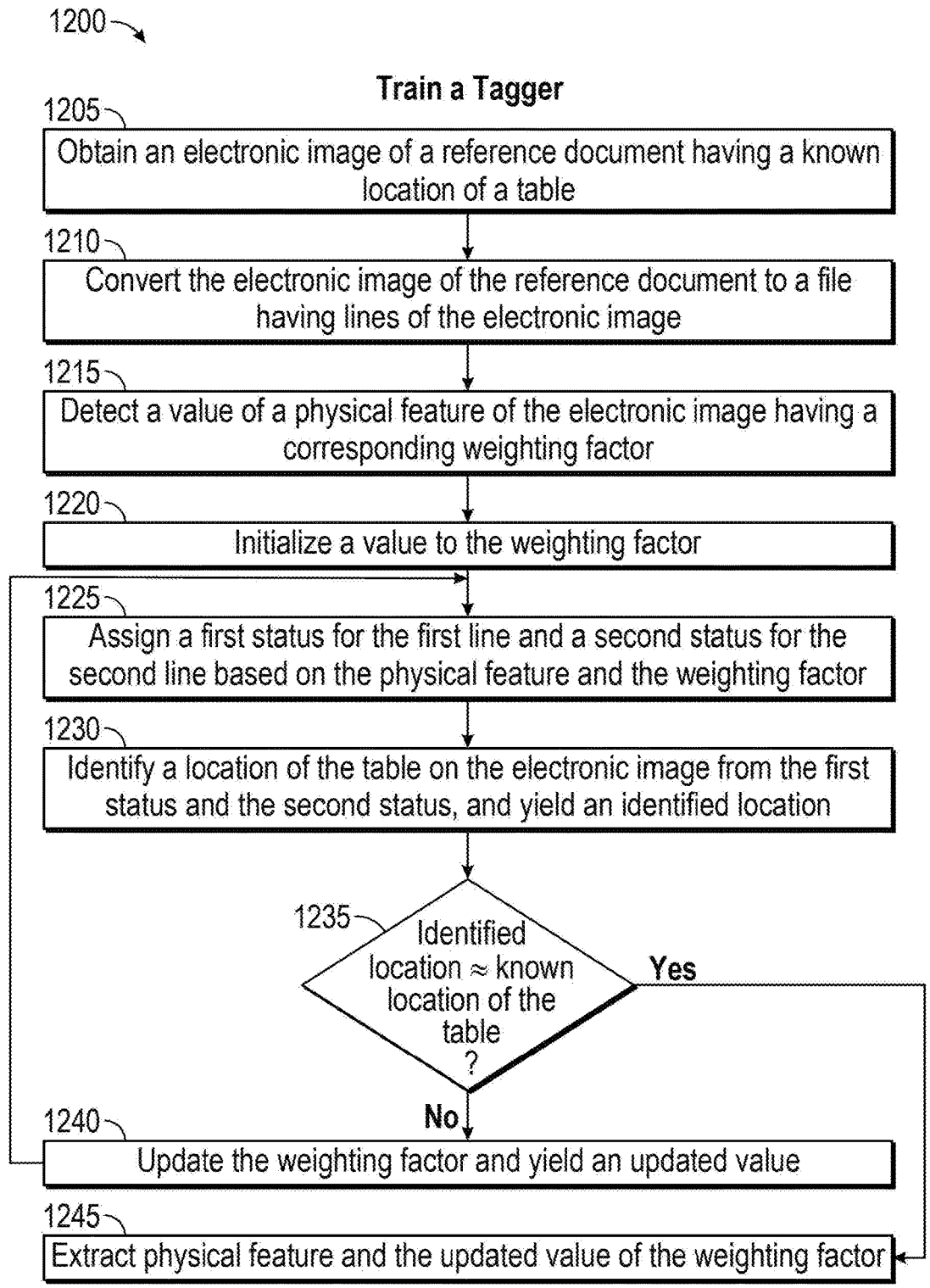
FIG. 12 is a flowchart of a method of training a tagger employed by the system of FIG. 1.

FIG. 12 is a flowchart of a method of training sequence tagger 121 by system 100. More specifically, method 1200 of training sequence tagger 121 comprises the following operations from an operation 1205 to an operation 1245.

During operation 1205, processor 110 obtains native PDF document 203 that has a known location of table 505.

During operation 1210, user 101 selects table 505 of native PDF document 203 and saves to XML file 204 having lines of native PDF document 203.

During operation 1215, processor 110 detects a value of a physical feature of native PDF document 203. There is a weighting factor corresponding to the physical feature.

During operation 1220, processor 110 initializes a value to the weighting factor.

During operation 1225, processor 110 assigns a first status for the first line and a second status for the second line based on the physical feature and the weighting factor.

During operation 1230, processor 110 identifies a location of table 505 in native PDF document 203 from the first status and the second status. An identified location is yielded from the identification of the location of table 505.

During operation 1235, processor 110 compares the identified location with the known location of table 505 and identifies a difference. If the difference is greater than a pre-determined threshold, processor 110 proceeds method 1200 of training sequence tagger 121 to operation 1240. If the difference is lower than the pre-determined threshold, processor 110 proceeds method 1200 to operation 1245.

During operation 1240, processor 110 updates the weighting factor for the physical feature. An updated value of the weighting factor is yielded from the process of updating. The updated values is utilized during operation 1225 so that processor 1110 assigns an updated first status for the first line and an updated second status for the second line based on the physical feature and the updated value of the weighting factor.

During operation 1245, processor 110 extracts the physical feature and the updated value of the weighting factor.

Method 1200 of training sequence tagger 121 is repeated for reference documents 132 to train sequence tagger 121 by method 1200. Specifically, the above operations from operation 1205 to operation 1245 can be repeated for more than one document until a plurality of reference documents 132 have been utilized to improve the accuracy of sequence tagger 121 in identifying structures of reference documents 132. Then the features and weighting factors of sequence tagger 121 are saved for sequence tagger 121 via operation 1245.

In another embodiment, in method 1200 of training sequence tagger 121, a feature function has a physical feature and a weighting factor as inputs and the feature function has an output for a status of a line of a native PDF document. Each physical feature has a weighting factor.

In another embodiment, in method 1200 of training sequence tagger 121, a feature function has a plurality of physical features and a plurality of weighting factors as inputs, and the feature function has an output for a status of a line of a native PDF document. Each physical feature of the plurality of physical features has a weighting factor.

Figure 13:
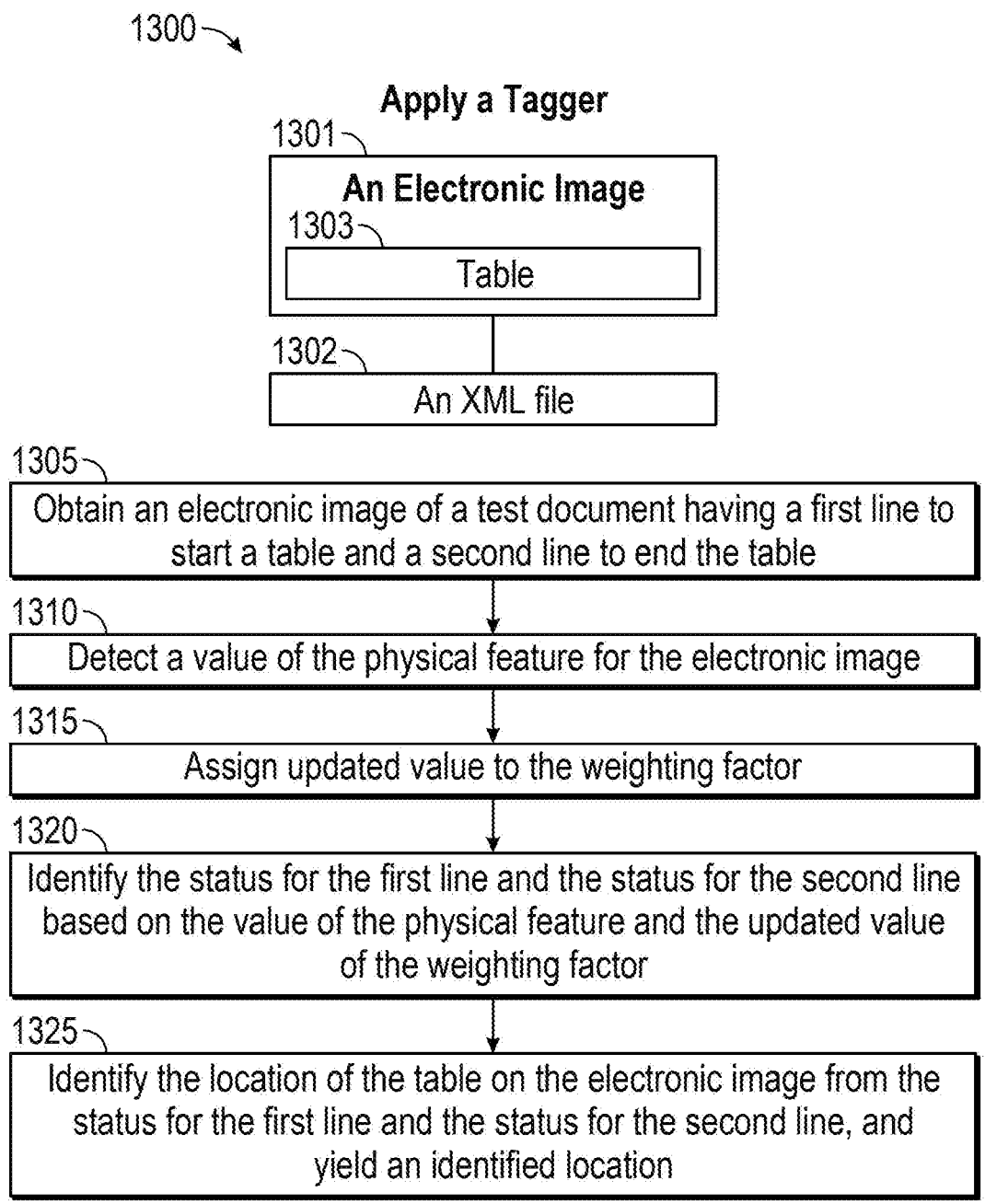
FIG. 13 is a flowchart of a method of applying the tagger that has been trained by the method represented in FIG. 12.

FIG. 13 is a flowchart of method 1300 of applying the sequence tagger 121 that has been trained by method 1200 represented in FIG. 12. Specifically, sequence tagger 121 is utilized to identify a table 1303 for a native PDF 1301 of a test document after sequence tagger 121 has been trained. Method 1300 of applying sequence tagger 121 comprises the following operations from an operation 1305 to an operation 1325.

During operation 1305, processor 110 obtains native PDF 1301 of a test document having a first line to start table 1303 and a second line to end table 1303. Converter 122 converts native PDF 1301 having a first line to start table 1303 and a second line to end table 1303 to an XML file 1302 of the test document having the first line to start table 1303 and the second line to end table 1303.

During operation 1310: processor 110 detects a value of the physical feature for XML file 1302 and for native PDF 1301. The physical feature is the same physical feature as described in method 1100 of table recovery and/or method 1200 of training sequence tagger 121.

During operation 1315, processor 110 assigns the updated value to the weighing factor after sequence tagger 121 has been trained.

During operation 1320, processor 110 identifies the status for the first line and the status for the second line based on the value of the physical feature and the updated value of the weighting factor.

During operation 1325, processor 110 identifies the location of table 1303 in native PDF 1301 from the status for the first status and the status for the second line. An identified location is yielded from the identification of the location of table 1303.

After sequence tagger 121 is utilized to detect table 1303 of XML file 1302 and native PDF 1301, XML file 1302 of the test document is saved as a HTML file.

Some differences between method 1200 of training sequence tagger 121 and method 1300 of applying sequence tagger 121 are that: (1) in method 1200 of training sequence tagger 121, a feature function has a physical feature as an input and a known status of a reference document as an output, but the weighing factor as an input for the feature function is unknown; (2) in method 1300 of applying sequence tagger 121, the physical feature and the weighting factor have been determined from method 1200 of training sequence tagger 121, and both the physical features and the weighting factor are inputs for a feature function. Sequence tagger 121 tags each line of test document and determines the status of each line with the physical feature and the weighting factor; and (3) in both method 1200 of training sequence tagger 121 and method 1300 of applying sequence tagger 121, native PDFs are converted to files that processor 110 can read text, image, stroke and their locations from the files. However, the native PDF files of reference documents 132 in method 1200 of training sequence tagger 121 is either converted with a PDF annotator manually, or is converted by converter 122 automatically, and test documents 127 in method 1300 of applying sequence tagger 121 are converted by converter 122 automatically.

Figures 14, 15:
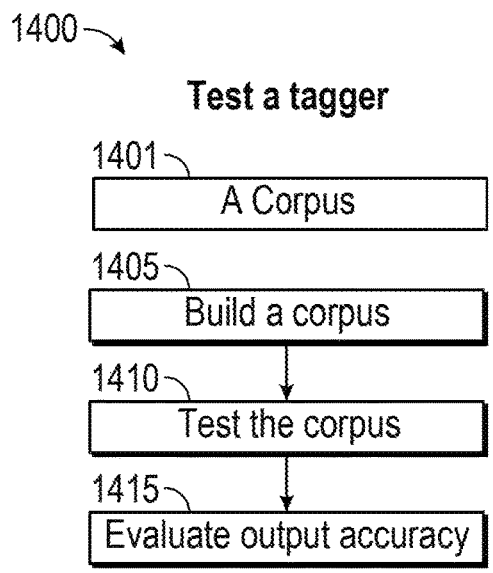
FIG. 14 is a flowchart of a method of testing the tagger that has been trained by the method represented in FIG. 12.
FIG. 15 is a table of results of testing a corpus by the system of FIG. 1

FIG. 14 is a flowchart of a method of testing sequence tagger 121 that is trained by the method represented in FIG. 12. Method 1400 of testing sequence tagger 121 includes the following operations from operation 1405 to operation 1415.

During operation 1405, processor 110 builds a corpus 1401 to evaluate accuracy of sequence tagger 121. Corpus 1401 contains a plurality of test documents 132 to evaluate the accuracy of sequence tagger 121 in identifying table areas correctly. More specifically, in the present disclosure, processor 110 builds corpus 1401 that contains two hundred and thirty-five test documents with five hundreds and four tables.

During operation 1410, processor 110 evaluates corpus 1401. Converter 122 converts two hundred and thirty-five test documents to XML files or HTML files. Sequence tagger 121 tags each table of these two hundred and thirty-five test documents.

During operation 1415, processor 110 evaluates the testing results. The evaluation shows that sequence tagger 121 can have an accuracy of 97% in identifying table areas correctly. Specifically, corpus 1401 identifies table areas of the two hundred and thirty-five test documents from financial markets of Canada, Australian and New Zealand with an accuracy up to 97%. The accuracy is concluded by counting the number of tables that are perfectly identified in HTMLs. The results are shown in FIG. 15.

FIG. 15 is a table of results of testing corpus 1401 of system 100. In the table of FIG. 15, the number of documents from market of Canada is eighty-nine, and 95.30% of accuracy has been achieved in identifying tables for these eighty-nine documents. The number of documents from market of Australian is ninety-two, and 97.10% of accuracy has been achieved in identifying tables for these ninety-two documents. The number of documents from market of New Zealand is fifty-four, and 95.2% % of accuracy has been achieved in identifying tables for these fifty-four documents.

In the present disclosure, even though identifying structures of the native PDF includes only recovering page layouts, paragraphs and tables of the native PDF document, identifying structures of a chapter and a section of a native PDF can be achieved.

A native PDF is a file that is generated from an electronic source—such as a Word document, a computer generated report, or spreadsheet data. These have an internal structure that can be read and interpreted. If a file is not in an electronic format, the file can be scanned to create and capture a native PDF file.

In the present disclosure, even though system 100 discloses identifying structures of a document with a single page, paragraphs and tables that span multiple pages can be "stitched" in a post-processing operation.

In the present disclosure, a single page has absolutely positioned words as well as some visual cues such as lines, background and color. Words and some visual cues such as lines, background and color can be extracted by a PDF tool such as an X-Pdf tool. Accordingly, the present disclosure does not describe the process of combining individual characters into words, even though the process of combining individual characters into words can be achieved.

In the present disclosure, system 100 discloses that file 204 is an XML file. File 204 can be a HTML file. Further, file 204 can be any file that is taggable by a sequence tagging application.

The present disclosure identifies structures of native PDF documents, which are generated from an electronic source such as Microsoft Word document, excel spreadsheet or PowerPoint. The contents of native PDF documents can be selected and highlighted. Non-native PDF document such as image or scanned PDFs can be converted to native PDFs for recovering structures.

The present disclosure discloses building a language independent technique for identifying structures of a native PDF document. Specifically, a language-specific model can be built for each language without additional development. Accordingly, the system and the method can identify structures of native PDF documents in different languages.

The techniques described herein are exemplary, and should not be construed as implying any particular limitation on the present disclosure. It should be understood that various alternatives, combinations and modifications could be devised by those skilled in the art. For example, operations associated with the processes described herein can be performed in different order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method comprising:
    obtaining a native PDF document having a first line to start a table and a second line to end said table;
        wherein said native PDF document is a reference native PDF document having a known location of said table;
    detecting a value of a physical feature in said native PDF document using sequence tagging, wherein said physical feature has a corresponding weighting factor;
    initiating a value to said weighting factor;
    assigning a first status for said first line and a second status for said second line based on (a) said physical feature and (b) said weighting factor;
    identifying a location of said table in said native PDF document from said first status and said second status, thus yielding an identified location of said table;
    comparing said identified location to said known location, thus yielding a difference between said identified location and said known location; and
    updating said value of said weighting factor to reduce said difference, thus yielding an updated value for said weighting factor.

2. The method of claim 1, further comprising:
    repeating said assigning and said identifying using said updated value, thus yielding an updated identified location of said table.

3. The method of claim 2, further comprising:
    extracting rows, columns and cells of said table based on said updated identified location.

4. The method of claim 1, further comprising:
    detecting a value of said physical feature for a second native PDF document; and
    identifying a location of a second table in said second native PDF document based on (a) said value of said physical feature for said second election image and (b) said updated value for said weighting factor.

5. The method of claim 1, wherein said detecting comprising converting said native PDF document to a file having lines of said native PDF document.

6. The method of claim 1, further comprising converting the PDF document to an XML, file before applying sequence tagging.

7. A system comprising:
    a processor; and
    a memory that contains instructions that are readable by said processor to cause said processor to perform actions of:

obtaining from a storage device a native PDF document having a first line to start a table and a second line to end said table;
    wherein said native PDF document is a reference native PDF document having a known location of said table;
detecting a value of a physical feature in said native PDF document using sequence tagging, wherein said physical feature has a corresponding weighting factor;
initiating a value to said weighting factor;
assigning a first status for said first line and a second status for said second line based on (a) said physical feature and (b) a weighting factor;
identifying a location of said table in said native PDF document from said first status and said second status, thus yielding an identified location of said table;
comparing said identified location to said known location, thus yielding a difference between said identified location and said known location; and
updating said value to reduce said difference, thus yielding an updated value for said weighting factor.

8. The system of claim 7, wherein said instructions also cause said processor to perform action of:
    repeating said assigning and said identifying using said updated value, thus yielding an updated identified location of said table.

9. The system of claim 8, wherein said instructions also cause said processor to perform action of:
    extracting rows, columns and cells of said table based on said updated identified location.

10. The system of claim 7, wherein said instructions also cause said processor to perform actions of:
    detecting a value of said physical feature for a second native PDF document; and
    identifying a location of a second table in said second native PDF document based on (a) said value of said physical feature for said second election image and (b) said updated value for said weighting factor.

11. The system of claim 7, wherein said detecting comprising converting said native PDF document to a file having lines of said native PDF document.

12. The system of claim 7, wherein the actions further comprise converting the PDF document to an XML file before applying sequence tagging.

13. A non-transitory computer readable medium comprising instructions that are readable by a processor to cause said processor to perform actions of:
    obtaining a native PDF document having a first line to start a table and a second line to end said table;
        wherein said native PDF document is a reference native PDF document having a known location of said table;
    detecting a value of a physical feature of said native PDF document using sequence tagging, wherein said physical feature has a corresponding weighting factor;
    initiating a value to said weighting factor;
    assigning a first status for said first line and a second status for said second line based on (a) said physical feature and (b) a weighting factor;
    identifying a location of said table in said native PDF document from said first status and said second status, thus yielding an identified location of said table;
    comparing said identified location to said known location, thus yielding a difference between said identified location and said known location; and
    updating said value to reduce said difference, thus yielding an updated value for said weighting factor.

14. The non-transitory computer readable medium of claim 13, wherein said instructions also cause said processor to perform action of:
    repeating said assigning and said identifying using said updated value, thus yielding an updated identified location of said table.

15. The non-transitory computer readable medium of claim 14, wherein said instructions also cause said processor to perform action of:
    extracting rows, columns and cells of said table based on said updated identified location.

16. The non-transitory computer readable medium of claim 13, wherein said instructions also cause said processor to perform actions of:
    detecting a value of said physical feature for a second native PDF document; and
    identifying a location of a second table in said second native PDF document based on (a) said value of said physical feature for said second election image and (b) said updated value for said weighting factor.

17. The non-transitory computer readable medium of claim 13, wherein said detecting comprising converting said native PDF document to a file having lines of said native PDF document.

* * * * *